United States Patent
Keller et al.

(10) Patent No.: US 10,310,804 B2
(45) Date of Patent: Jun. 4, 2019

(54) MODIFYING HAPTIC FEEDBACK PROVIDED TO A USER TO ACCOUNT FOR CHANGES IN USER PERCEPTION OF HAPTIC FEEDBACK

(71) Applicant: Facebook Technologies, LLC, Menlo Park, CA (US)

(72) Inventors: Sean Jason Keller, Kirkland, WA (US); Tristan Thomas Trutna, Seattle, WA (US); David R. Perek, Bellevue, WA (US); Bruce A. Cleary, III, Seattle, WA (US); Brian Michael Scally, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 208 days.

(21) Appl. No.: 15/375,402

(22) Filed: Dec. 12, 2016

(65) Prior Publication Data
US 2017/0168773 A1 Jun. 15, 2017

Related U.S. Application Data

(60) Provisional application No. 62/266,492, filed on Dec. 11, 2015.

(51) Int. Cl.
*G06F 3/16* (2006.01)
*G06F 3/01* (2006.01)

(52) U.S. Cl.
CPC ............. *G06F 3/165* (2013.01); *G06F 3/011* (2013.01)

(58) Field of Classification Search
CPC combination set(s) only.
See application file for complete search history.

(56) References Cited

U.S. PATENT DOCUMENTS

| 5,959,613 A * | 9/1999 | Rosenberg | A63F 13/06 341/20 |
| 2012/0206247 A1* | 8/2012 | Bhatia | G06F 3/016 340/407.1 |

* cited by examiner

*Primary Examiner* — Jennifer Mehmood
*Assistant Examiner* — Deeprose Subedi
(74) *Attorney, Agent, or Firm* — Fenwick & West LLP

(57) ABSTRACT

A system modifies data generating haptic feedback to account for changes in user perception of haptic feedback. The system identifies haptic data and determines an estimated amplitude of haptic feedback corresponding to a portion of the haptic data. Responsive to the estimated amplitude of the haptic feedback corresponding to the portion of the haptic data exceeding a threshold value, a refractory period is determined that will occur after haptic feedback corresponding to the portion of the haptic data is applied to the user. The portion of the haptic data is provided to an input interface, and a set of haptic data associated with times within a duration of the refractory period from the identified haptic data is removed to form an adjusted data set that is provided to the input interface to provide haptic feedback to the user in accordance with adjusted haptic data set.

18 Claims, 5 Drawing Sheets

US 10,310,804 B2

MODIFYING HAPTIC FEEDBACK PROVIDED TO A USER TO ACCOUNT FOR CHANGES IN USER PERCEPTION OF HAPTIC FEEDBACK

CROSS REFERENCE TO RELATED APPLICATIONS

This application claims the benefit of U.S. Provisional Application No. 62/266,492, filed Dec. 11, 2015, which is incorporated by reference in its entirety.

BACKGROUND

The present disclosure generally relates to haptic feedback, and specifically to modifying data generating haptic feedback to account for changes in user perception of haptic feedback.

Virtual reality (VR) is a simulated environment created by computer technology and presented to a user, such as through a VR system. For example, a VR system presents audio and visual data to a user to present the simulated environment to a user. Additionally, a VR system may also provide haptic feedback to a user to more fully immerse a user in the simulated environment by simulating a sense of touch to the user via various methods, e.g., vibration, heat, force, or motion. However, certain types of feedback presented to a user by the VR system may affect a user's perception of subsequent feedback. For example, haptic feedback having greater than a threshold amplitude or frequency may prevent a user from detecting haptic feedback provided within a threshold time interval of the haptic feedback with greater than the threshold amplitude or frequency. Similarly, providing a user with an audio signal having greater than a threshold amplitude may prevent a user from hearing audio signals with lesser amplitudes presented within a threshold time interval of the audio signal having greater than the threshold amplitude.

SUMMARY

A system is configured to modify data generating haptic feedback to account for changes in user perception of haptic feedback. For example, the system removes a set of haptic data associated with times within a refractory period to prevent application of haptic feedback to a user during the refractory period. A refractory period refers to a time interval that a user may have decreased sensitivity to lower amplitude haptic feedback applied during the time interval subsequent to application of the haptic feedback greater than a threshold amplitude.

In some embodiments, the system includes an input interface (e.g., a virtual reality (VR)) and a console (e.g., VR console). The input interface provides haptic feedback to a user in accordance with instructions received from the console. The console identifies haptic data for communication to the input interface. Haptic data is data that the input interface uses to provide haptic feedback to the user. The console determines an estimated amplitude of haptic feedback corresponding to a portion of the haptic data. Responsive to the estimated amplitude of the haptic feedback exceeding a threshold value, the console determines that a refractory period can occur after haptic feedback corresponding to the portion of the haptic data is applied to the user. The console provides the portion of the haptic data to the input interface, and removes a set of haptic data associated with times within a duration of the refractory period from the identified haptic data to form an adjusted haptic data set. The console provides to the input interface the adjusted haptic data set, and the input interface provides haptic feedback to the user in accordance with adjusted haptic data set.

The figures depict embodiments of the present disclosure for purposes of illustration only. One skilled in the art will readily recognize from the following description that alternative embodiments of the structures and methods illustrated herein may be employed without departing from the principles of the disclosure described herein.

DETAILED DESCRIPTION

System Overview

Figure 1:
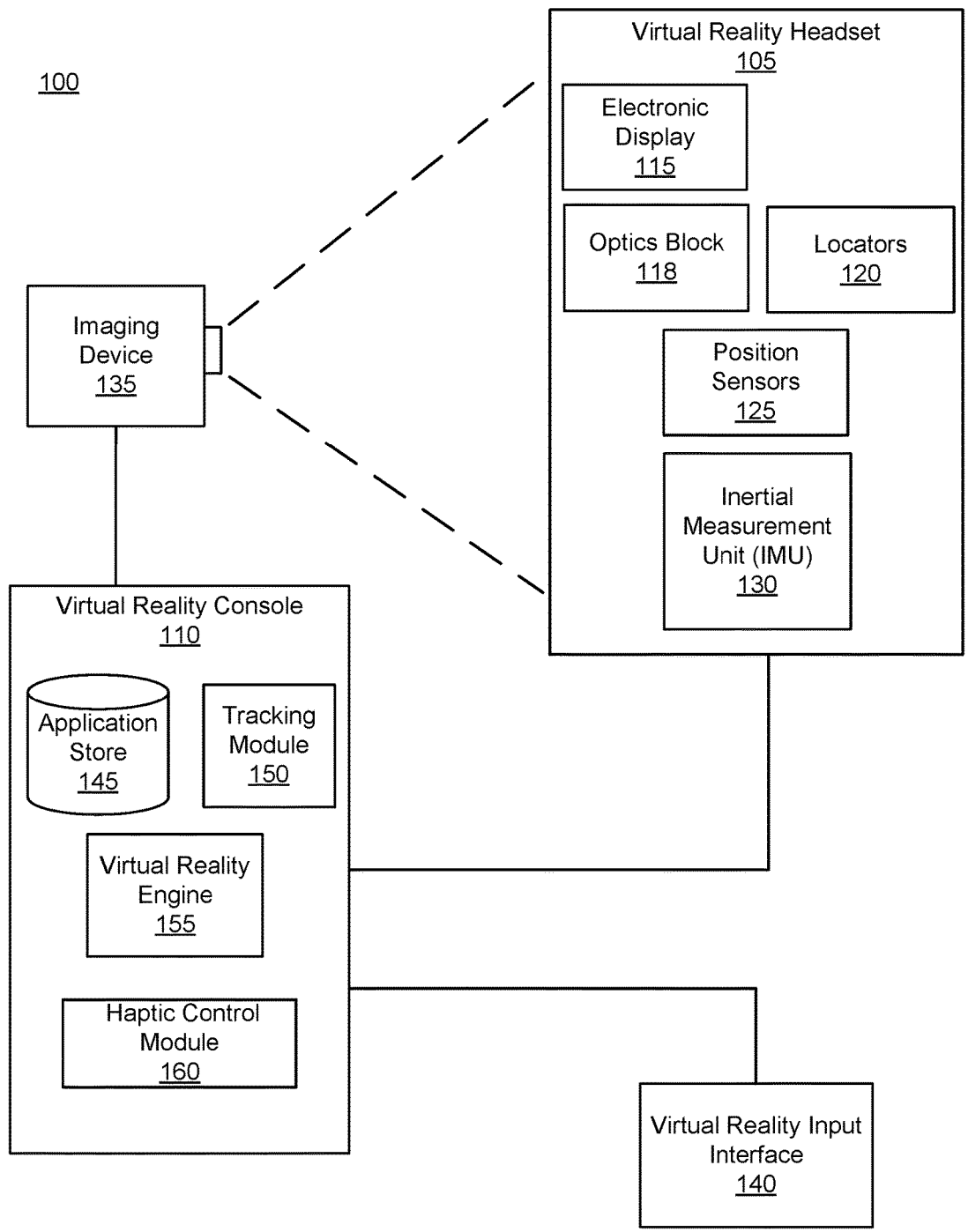
FIG. 1 is a block diagram of a system environment including a virtual reality system, in accordance with an embodiment.

FIG. 1 is a block diagram of a virtual reality (VR) system environment 100 in which a VR console 110 operates. The system environment 100 shown by FIG. 1 comprises a VR headset 105, an imaging device 135, and a VR input interface 140 that are each coupled to the VR console 110. While FIG. 1 shows an example VR system environment 100 including one VR headset 105, one imaging device 135, and one VR input interface 140, in other embodiments any number of these components may be included in the VR system environment 100. For example, there may be multiple VR headsets 105 each having an associated VR input interface 140 and monitored by one or more imaging devices 135, with each VR headset 105, VR input interface 140, and imaging devices 135 communicating with the VR console 110. In alternative configurations, different and/or additional components may be included in the VR system environment 100. Similarly, functionality of one or more of the components may be distributed among the components in a different manner than is described here. For example, some or all of the functionality of the VR console 110 may be contained within the VR headset 105.

The VR headset 105 is a head-mounted display that presents content to a user. Examples of content presented by the VR headset 105 include one or more images, video, audio, or some combination thereof. In some embodiments, audio is presented via an external device (e.g., speakers and/or headphones) that receives audio information from the VR headset 105, the VR console 110, or both, and presents audio data based on the audio information. The VR headset 105 may comprise one or more rigid bodies, which may be rigidly or non-rigidly coupled to each other together. A rigid coupling between rigid bodies causes the coupled rigid bodies to act as a single rigid entity. In contrast, a non-rigid coupling between rigid bodies allows the rigid bodies to move relative to each other. In some embodiments, the VR headset 105 may also act as an augmented reality (AR) headset. In these embodiments, the VR headset 105 augments views of and of a physical, real-world environment with computer-generated elements (e.g., images, video, sound, etc.).

The VR headset 105 includes an electronic display 115, an optics block 118, one or more locators 120, one or more position sensors 125, and an inertial measurement unit (IMU) 130. The electronic display 115 displays images to the user in accordance with data received from the VR console 110. In various embodiments, the electronic display 115 may comprise a single electronic display or multiple electronic displays (e.g., a display for each eye of a user). Examples of the electronic display 115 include: a liquid crystal display (LCD), an organic light emitting diode (OLED) display, an active-matrix organic light-emitting diode display (AMOLED), some other display, or some combination thereof.

The optics block 118 magnifies image light received from the electronic display 115, corrects optical errors associated with the image light, and presents corrected image light to a user of the VR headset 105. In various embodiments, the optics block 118 includes one or more optical elements. Example optical elements include: an aperture, a Fresnel lens, a convex lens, a concave lens, a filter, or any other suitable optical element that affects the image light emitted from the electronic display 115. Moreover, the optics block 118 may include combinations of different optical elements. In some embodiments, one or more of the optical elements in the optics block 118 may have one or more coatings, such as anti-reflective coatings.

Magnification of the image light by the optics block 118 allows the electronic display 115 to be physically smaller, weigh less, and consume less power than larger displays. Additionally, magnification may increase a field of view of the displayed media. For example, the field of view of the displayed media is such that the displayed media is presented using almost all (e.g., 110 degrees diagonal), and in some cases all, of the user's field of view. In some embodiments, the dark spaces can effectively be reduced to zero. In some embodiments, the optics block 118 is designed so its effective focal length is larger than the spacing to the electronic display 115, which magnifies the image light projected by the electronic display 115. Additionally, in some embodiments, the amount of magnification may be adjusted by adding or removing optical elements from the optics block 118.

The optics block 118 may be designed to correct one or more types of optical error. Examples of optical error include: two dimensional optical errors, three dimensional optical errors, or some combination thereof. Two dimensional errors are optical aberrations that occur in two dimensions. Example types of two dimensional errors include: barrel distortion, pincushion distortion, longitudinal chromatic aberration, transverse chromatic aberration, or any other type of two-dimensional optical error. Three dimensional errors are optical errors that occur in three dimensions. Example types of three dimensional errors include spherical aberration, comatic aberration, field curvature, astigmatism, or any other type of three-dimensional optical error. In some embodiments, content provided to the electronic display 115 for display is pre-distorted, and the optics block 118 corrects the distortion when it receives image light from the electronic display 115 generated based on the content.

The locators 120 are objects located in specific positions on the VR headset 105 relative to one another and relative to a specific reference point on the VR headset 105. A locator 120 may be a light emitting diode (LED), a corner cube reflector, a reflective marker, a type of light source that contrasts with an environment in which the VR headset 105 operates, or some combination thereof. In embodiments where the locators 120 are active (i.e., an LED or other type of light emitting device), the locators 120 may emit light in the visible band (~380 nm to 750 nm), in the infrared (IR) band (~750 nm to 1 mm), in the ultraviolet band (10 nm to 380 nm), some other portion of the electromagnetic spectrum, or some combination thereof.

In some embodiments, the locators 120 are located beneath an outer surface of the VR headset 105, which is transparent to the wavelengths of light emitted or reflected by the locators 120 or is thin enough not to substantially attenuate the wavelengths of light emitted or reflected by the locators 120. Additionally, in some embodiments, the outer surface or other portions of the VR headset 105 are opaque in the visible band of wavelengths of light. Thus, the locators 120 may emit light in the IR band under an outer surface that is transparent in the IR band but opaque in the visible band.

The IMU 130 is an electronic device that generates fast calibration data indicating an estimated position of the VR headset 105 relative to an initial position of the VR headset 105 based on measurement signals received from one or more of the position sensors 125. A position sensor 125 generates one or more measurement signals in response to motion of the VR headset 105. Examples of position sensors 125 include: one or more accelerometers, one or more gyroscopes, one or more magnetometers, another suitable type of sensor that detects motion, a type of sensor used for error correction of the IMU 130, or some combination thereof. The position sensors 125 may be located external to the IMU 130, internal to the IMU 130, or some combination thereof.

Based on the one or more measurement signals from one or more position sensors 125, the IMU 130 generates fast calibration data indicating an estimated position of the VR headset 105 relative to an initial position of the VR headset 105. For example, the position sensors 125 include multiple accelerometers to measure translational motion (forward/back, up/down, left/right) and multiple gyroscopes to measure rotational motion (e.g., pitch, yaw, roll). In some embodiments, the IMU 130 rapidly samples the measurement signals and calculates the estimated position of the VR headset 105 from the sampled data. For example, the IMU 130 integrates the measurement signals received from the accelerometers over time to estimate a velocity vector and integrates the velocity vector over time to determine an estimated position of a reference point on the VR headset 105. Alternatively, the IMU 130 provides the sampled measurement signals to the VR console 110, which determines the fast calibration data. The reference point is a point that may be used to describe the position of the VR headset 105. While the reference point may generally be defined as a point in space; however, in practice the reference point is defined as a point within the VR headset 105 (e.g., a center of the IMU 130).

The IMU 130 receives one or more calibration parameters from the VR console 110. As further discussed below, the one or more calibration parameters are used to maintain tracking of the VR headset 105. Based on a received calibration parameter, the IMU 130 may adjust one or more IMU parameters (e.g., sample rate). In some embodiments, certain calibration parameters cause the IMU 130 to update an initial position of the reference point so it corresponds to a next calibrated position of the reference point. Updating the initial position of the reference point as the next calibrated position of the reference point helps reduce accumulated error associated with the determined estimated position. The accumulated error, also referred to as drift error, causes the estimated position of the reference point to "drift" away from the actual position of the reference point over time.

The imaging device 135 generates slow calibration data in accordance with calibration parameters received from the VR console 110. Slow calibration data includes one or more images showing observed positions of the locators 120 that are detectable by the imaging device 135. The imaging device 135 may include one or more cameras, one or more video cameras, any other device capable of capturing images including one or more of the locators 120, or some combination thereof. Additionally, the imaging device 135 may include one or more filters (e.g., used to increase signal to noise ratio). The imaging device 135 is configured to detect light emitted or reflected from locators 120 in a field of view of the imaging device 135. In embodiments where the locators 120 include passive elements (e.g., a retroreflector), the imaging device 135 may include a light source that illuminates some or all of the locators 120, which retro-reflect the light towards the light source in the imaging device 135. Slow calibration data is communicated from the imaging device 135 to the VR console 110, and the imaging device 135 receives one or more calibration parameters from the VR console 110 to adjust one or more imaging parameters (e.g., focal length, focus, frame rate, ISO, sensor temperature, shutter speed, aperture, etc.).

The VR input interface 140 is a device that allows a user to send action requests to the VR console 110. An action request is a request to perform a particular action. For example, an action request may be to start an application, to end an application, or to perform a particular action within the application. The VR input interface 140 may include one or more input devices. Example input devices include: a keyboard, a mouse, a game controller, or any other suitable device for receiving action requests and communicating the received action requests to the VR console 110. An action request received by the VR input interface 140 is communicated to the VR console 110, which performs an action corresponding to the action request.

In some embodiments, the VR input interface 140 provides haptic feedback to the user in accordance with instructions received from the VR console 110. For example, the VR input interface 140 provides haptic feedback when an action request. As another example, the VR console 110 communicates instructions to the VR input interface 140 causing the VR input interface 140 to generate haptic feedback when the VR console 110 performs an action. For example, the VR input interface 140 provides haptic feedback to a user via various actuators that provide mechanical, electronic, electromagnetic, or chemical stimuli in a controlled manner to induce sensations of pressures, forces, vibrations, or heat. Various types of actuators may be used by the VR input interface 140. Example types of actuators include: mechanical actuators, fluidic actuators, electric actuators, or electromechanical actuators. In various embodiments, actuators included in the VR input interface 140 are activated to provide haptic feedback based on instructions from the VR console 110, which may correspond to content presented to the user by the VR headset 105. Actuators may be located on various surfaces of the VR input interface 140. For example, if the VR input interface 140 is a glove or another device contacting a portion of a user's body, the actuators may be located on an interior or an exterior surface of the VR input interface 140, allowing the actuators to provide tactile feedback to the portion of the user's body contacting the VR input interface 140. In some embodiments, the VR input interface 140 presents audio that receives audio information from the VR headset 105, the VR console 110, or both. Examples of the VR input interface 140 include speakers, headphones, or other suitable device that presents audio.

The VR console 110 provides content to the VR headset 105 for presentation to the user in accordance with information received from one or more of: the imaging device 135, the VR headset 105, and the VR input interface 140. In the example shown in FIG. 1, the VR console 110 includes an application store 145, a tracking module 150, a VR engine 155, and a haptic control module 160. Some embodiments of the VR console 110 have different modules than those described in conjunction with FIG. 1. For example, some or all of the haptic control module 160 may be performed by the VR input interface 140. Similarly, the functions further described below may be distributed among components of the VR console 110 in a different manner than is described here.

The application store 145 stores one or more applications for execution by the VR console 110. An application is a group of instructions that, when executed by a processor, generates content for presentation to the user. Content generated by an application may be in response to inputs received from the user via movement of the HR headset 105 or the VR interface device 140. Examples of applications include: gaming applications, conferencing applications, video playback application, or other suitable applications.

The tracking module 150 calibrates the VR system environment 100 using one or more calibration parameters and may adjust one or more calibration parameters to reduce error in determining of the position of the VR headset 105. For example, the tracking module 150 adjusts the focus of the imaging device 135 to obtain a more accurate position for observed locators on the VR headset 105. Moreover, calibration performed by the tracking module 150 also accounts for information received from the IMU 130. Additionally, if tracking of the VR headset 105 is lost (e.g., the imaging device 135 loses line of sight of at least a threshold number of the locators 120 on the VR headset 105), the tracking module 150 re-calibrates some or all of the VR system environment 100.

The tracking module 150 tracks movements of the VR headset 105 using slow calibration information from the imaging device 135. For example, the tracking module 150 determines positions of a reference point of the VR headset 105 using observed locators from the slow calibration information and a model of the VR headset 105. The tracking module 150 also determines positions of a reference point of the VR headset 105 using position information from the fast calibration information. Additionally, in some embodiments, the tracking module 150 may use portions of the fast calibration information, the slow calibration information, or some combination thereof, to predict a future location of the VR headset 105. The tracking module 150 provides the estimated or predicted future position of the VR headset 105 to the VR engine 155.

The VR engine 155 executes applications within the VR system environment 100 and receives position information, acceleration information, velocity information, predicted future positions, or some combination thereof, from the VR headset 105 or from the tracking module 150. Based on the received information, the VR engine 155 determines content to provide to the VR headset 105 for presentation to the user. For example, if the received information indicates that the user has looked to the left, the VR engine 155 generates content for the VR headset 105 that mirrors the user's movement in a virtual environment. Additionally, the VR engine 155 performs an action within an application executing on the VR console 110 in response to an action request received from the VR input interface 140 and provides feedback to the user that the action was performed. The provided feedback may be visual or audible feedback via the VR headset 105 or haptic feedback via the VR input interface 140.

The haptic control module 160 receives haptic data from the VR engine 155 for communication to the VR input interface 140, modifies the haptic data and communicates the modified haptic data to the VR input interface 140, which provides tactile feedback to a user based on the modified haptic data. In some embodiments, the haptic control module 160 generates modified haptic data by filtering out a set of haptic data from the haptic data received from the VR engine 155. The haptic data comprises data that causes the VR input interface 140 or another component of the VR system environment 100 (e.g., the VR headset 105) to provide haptic feedback to a user. Examples of haptic feedback include application of vibration to a user, application of pressure to a user, application of a temperature change to a user, or other suitable changes that a user may perceive through tactile senses.

After application of haptic feedback with greater than a threshold amplitude to a user, the user may have decreased sensitivity to lower amplitude haptic feedback applied during a time interval subsequent to application of the haptic feedback greater than the threshold amplitude. This time interval may be referred to herein as a "refractory period." Hence, during the refractory period, a user has decreased sensitivity to haptic feedback. The threshold amplitude for the haptic feedback starting the refractory period may be based on various factors. Example factors include: prior responses of a user to haptic feedback, characteristics of the user (e.g., gender, age), a type of haptic feedback applied to the user, a portion of the user's body to which the haptic feedback is applied or other suitable characteristic of a user or of the haptic feedback. The haptic control module 160 maintains one or more threshold amplitudes associated with haptic feedback. When the haptic control module 160 receives haptic data from the VR engine 155 causing haptic feedback with greater than a threshold amplitude, the haptic control module 160 determines a refractory period corresponding to the haptic feedback and subsequently filters out a set of haptic data received during the refractory period to prevent application of certain haptic feedback to a user, as further described below in conjunction with FIGS. 2A-4. In some embodiments, the threshold causing the refractory period not only depends on amplitude, but also depends on frequency.

Modifying Haptic Data to Modify Haptic Feedback Applied to a User

Figure 2A:
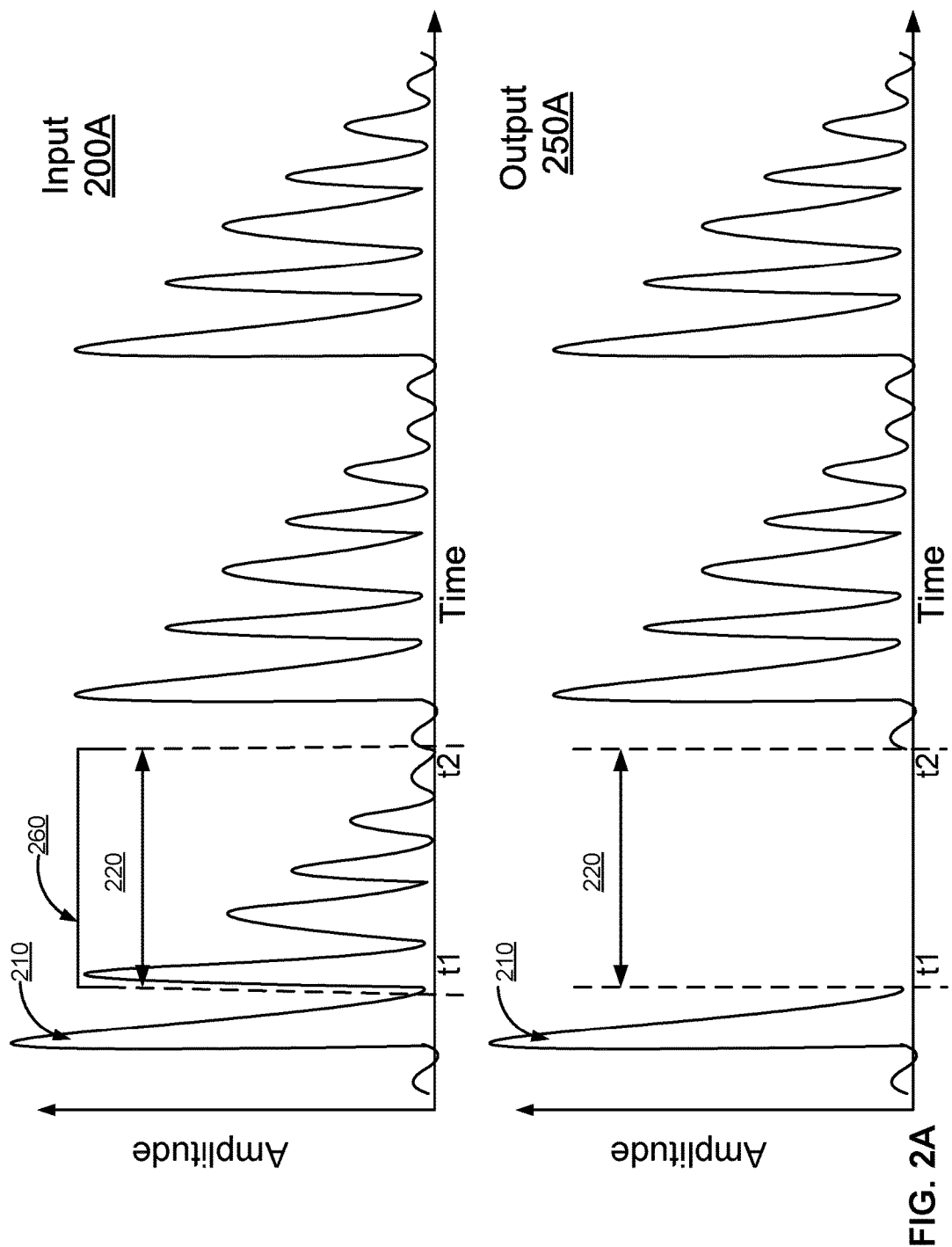
FIG. 2A illustrates an example modification of haptic data by filtering out portions of the haptic data within a refractory period, in accordance with an embodiment.

FIG. 2A illustrates an example modification of haptic data by filtering out portions of the haptic data within a refractory period. As shown in FIG. 2A, an input 200A received by the haptic control module 160 is a sequence of haptic data over time. In the example of FIG. 2A, the amplitude of the input 200A changes over time. The amplitude may be an amplitude of haptic feedback generated by the VR input interface 140 or another component of the VR system environment 100 in response to the haptic data. In various embodiments, the haptic control module 160 estimates the amplitude of the haptic feedback caused by the input 200A. The haptic control module 160 compares amplitudes of the haptic feedback caused by the input 200A at different times to a threshold value and identifies haptic data 210 having an amplitude equaling or exceeding the threshold value. After identifying the haptic data 210 having the amplitude equaling or exceeding the threshold value, the haptic control module 160 identifies a starting time t1 of a refractory period 260 as a time when the haptic control module 160 determines the amplitude of the input 200A is less than an additional threshold value. Hence, the starting time t1 of the refractory period 260 is a time after haptic feedback corresponding to the identified haptic data 210 has been provided to a user. Based on stored information, the haptic control module 160 determines a duration 220 of the refractory period 260. For example, the duration 220 of the refractory period 260 is determined based on characteristics of the user maintained by the haptic control module 160, as well as a type of haptic feedback generated by the input 200A. To prevent from over-stimulating the user with additional haptic feedback during the refractory period 260, which would not be perceived by the user, the haptic control module 160 generates output 250A for communication to a VR input interface 140 or other component by removing a set of the input associated with times within the duration 220 of the refractory period 260, as further described below in conjunction with FIGS. 3 and 4. For example, the output 250A does not include a set of the input 200A corresponding to times between the starting time t1 of the refractory period 260 and an ending time t2 of the refractory period 260. Hence, during the refractory period 260, the VR input interface 140 or other components of the VR system environment 100 does not provide haptic feedback to a user.

Figure 2B:
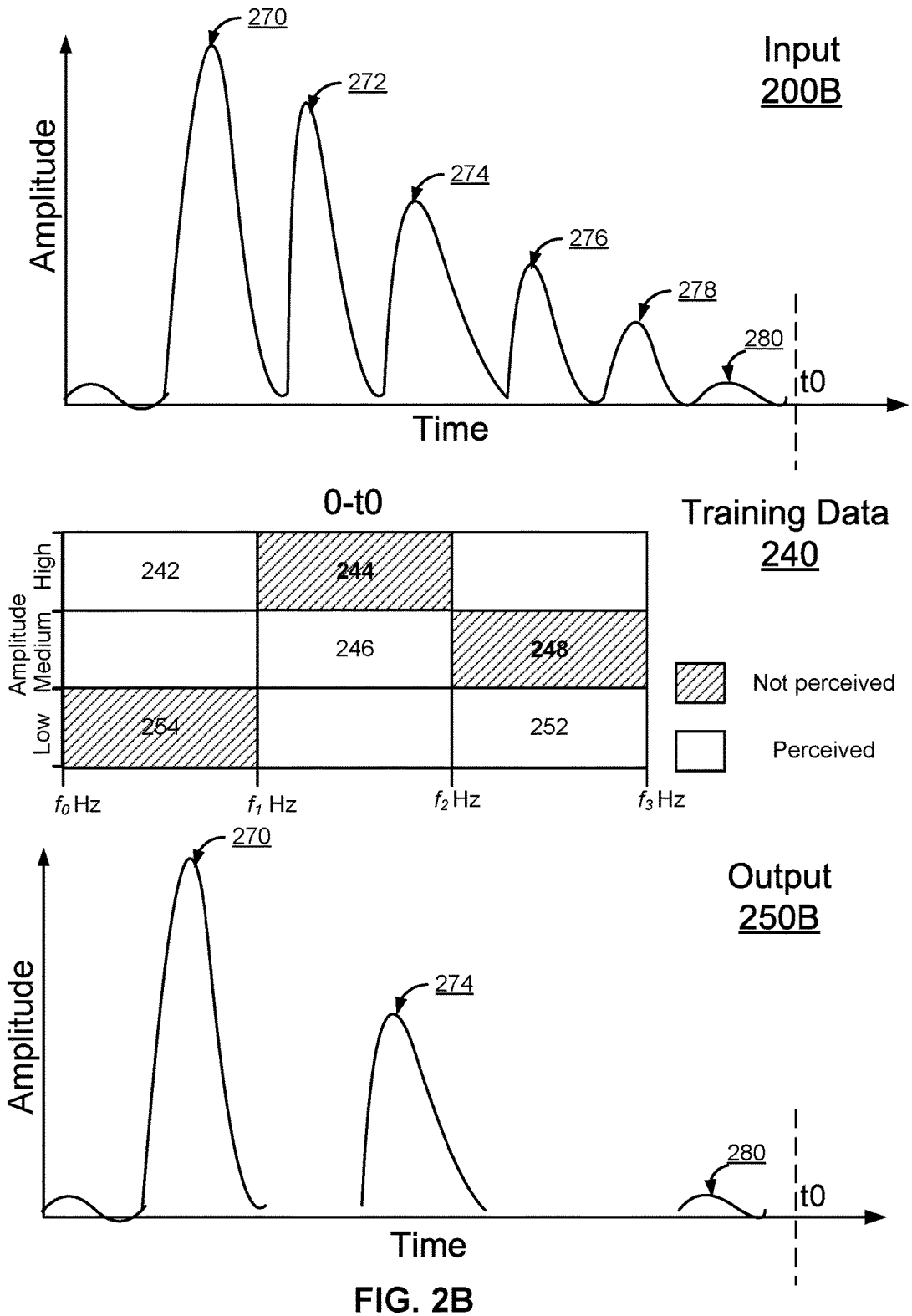
FIG. 2B illustrates an example modification of haptic data by filtering out portions of the haptic data based on comparison with training data, in accordance with an embodiment.

FIG. 2B illustrates a modification of haptic data by filtering out portions of the haptic data based on comparison with training data. As shown in FIG. 2B, an input 200B received by the haptic control module 160 is a sequence of haptic data over time. In the example of FIG. 2B, the amplitude of the input 200B changes over time.

A haptic control module 160 in a VR console 110 maintains training data 240 describing user perception of haptic feedback having various characteristics. In some embodiments, the training data 240 identifies different frequency ranges, amplitude (intensity) ranges, phase ranges of haptic feedback provided to a user from haptic data. In the example of FIG. 2B, the training data 240 includes frequency and amplitude ranges. For purposes of illustration, portions of the training data 240 in FIG. 2B that include a pattern corresponding to frequency ranges and amplitude ranges of haptic feedback that are perceived by a user while portions of the training data 240 in FIG. 2B including a pattern corresponding to frequency ranges and amplitude ranges of haptic feedback that are not perceived by the user. The training data 240 describes responses to haptic feedback having different amplitudes or different frequencies by a user or by a group of users. Hence, the training data 240 depends on parameters of haptic data or of haptic feedback corresponding to haptic data as well as characteristics of the user or of the group of users. The training data 240 may be obtained by statistical analysis of perception of haptic feedback by various users, machine learning applied to perception of haptic feedback by various users, data mining of perception of haptic feedback by various users, or by any other suitable method. Various types of training data 240 may be stored by the haptic control module 160 in different embodiments. Example types of training data 240 stored by the haptic control module 160 include: a probability distribution of a likelihood of perception of haptic feedback relative to different characteristics of the haptic feedback, clusters of users perceiving haptic feedback having different characteristics, or other suitable information (e.g., density, classification). In one example, the training data 240 is obtained from application of haptic feedback having different characteristics (e.g., gender, age) by one or more VR system environments 100 and analyzing input from various users indicating whether the users perceived haptic feedback having different characteristics. The training data 240 may identify characteristics of haptic feedback identified as perceived by the user or by a threshold number or percentage of users, characteristics of haptic feedback identified as not perceived by the user or by at least the threshold number or percentage of users, or characteristics of haptic feedback associated with indications of whether the user or at least a threshold number of users perceived or did not perceive the haptic feedback. The training data 240 may be stored in the haptic control module 160 or in the VR console 110.

The haptic control module 160 determines an output 250B provided to the VR input interface 140 or to the VR headset 105 by comparing the input 200B to the training data 240. In the example of FIG. 2B, the training data 240 identifies ranges of amplitudes and frequencies of haptic feedback and indications of whether the user perceives haptic feedback having an amplitude and a frequency within a range. The haptic control module 160 compares an amplitude of haptic feedback corresponding to the input 200B at various times to the training data 240 and filters out portions of the input 200B corresponding to haptic feedback having amplitudes or frequencies that the training data 240 indicates the user does not perceive, while communicating the remaining portions of the input 200B to the VR input interface 140 or to the VR headset 105.

In the example of FIG. 2B, the user perceives haptic feedback having frequencies and amplitudes within ranges 242, 246, 252, but is unable to perceive haptic feedback having frequencies and amplitudes within ranges 244, 248, 254. As further described below in conjunction with FIG. 4, the haptic control module 160 may obtain the amplitude and frequency ranges of haptic feedback perceived and not perceived by the user based on a calibration process where haptic feedback having different amplitudes and frequencies is applied to the user and feedback from the user regarding perception of haptic feedback with different amplitudes and frequencies is received from the user and stored by the haptic control module 160.

The haptic control module 160 determines frequencies and amplitudes of the input 200B and compares the determined frequencies and amplitudes to the stored training data 240. In the example of FIG. 2B, the training data 240 includes three frequency ranges from f0-f1 Hertz (Hz), f1-f2 Hz, and f2-f3 Hz, and also has three amplitude ranges identified as "low," "medium," and "high." The haptic control module 160 compares the amplitude and frequency of the input 200B at various times to the training data 240 and generates an output 250B where portions of the input 200B corresponding to haptic feedback having an amplitude and a frequency within a range of the training data 240 that the user does not perceive are removed, while portions of the input 200B corresponding to haptic feedback having an amplitude and a frequency within a range of the training data that the user perceives remain in the output 250B. For example, in FIG. 2B the input 200B includes multiple portions 270, 272, 274, 276, 278, 280 of haptic data. Portions 270, 274, and 280 correspond to haptic feedback having an amplitude and a frequency within one of ranges 242, 256, 252 in the training data 240, which correspond to haptic feedback perceived by the user. Conversely, portions 272, 276, 278 correspond to haptic feedback having an amplitude and a frequency within one of ranges 244, 248, 254 in the training data 240, which correspond to haptic feedback that is not perceived by the user. Hence, the haptic control module 160 generates an output 250B including portions 270, 274, 280, but not including portions 272, 276, 278.

Modification of Haptic Data to Adjust Haptic Feedback Provided to a User

Figure 3:
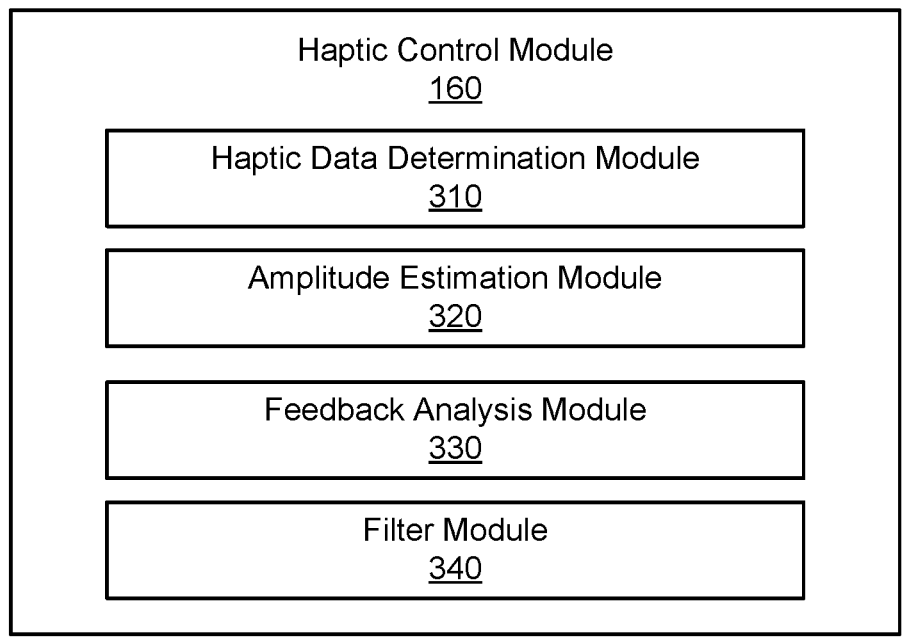
FIG. 3 is a block diagram of a haptic control module of a virtual reality console in a virtual reality system, in accordance with an embodiment.

FIG. 3 is a block diagram one embodiment of a haptic control module 160 of a virtual reality (VR) console 110 in a VR system environment 100. In the example of FIG. 3, the haptic control module 160 includes a haptic data determination module 310, an amplitude estimation module 320, a feedback analysis module 330, and a filter module 340. Some embodiments of the haptic control module 160 have different or additional components than those described in conjunction with FIG. 3. Similarly, the functionality of various components described in conjunction with FIG. 3 may be distributed among other components in the VR system environment 110 in a different manner than described in conjunction with FIG. 3. For example, some or all of the functionality of the haptic control module 160 described in conjunction with FIG. 3 may be performed by the VR input interface 140 in other embodiments.

The haptic data determination module 310 obtains haptic data from data generated by the VR engine 155. In some embodiments, the VR engine 155 communicates haptic data to the haptic data determination module 310. Alternatively, data for communication to the VR headset 105 or to the VR input interface 140 is communicated from the VR engine 155 to the haptic data determination module 310, which extracts haptic data from the data communicated by the VR engine 155. For example, the haptic data determination module 310 receives audio data, image data, and video data as well as haptic data causing haptic feedback and extracts the haptic data from the received data. In some embodiments, the haptic data determination module 310 identifies audio data from the data received from the VR engine 155.

The amplitude estimation module 320 estimates amplitudes of haptic feedback corresponding to haptic data at various times. Additionally, the amplitude estimation module 320 compares an amplitude of haptic feedback corresponding to haptic data to a threshold value. In various embodiments, the amplitude estimation module 320 maintains different threshold values corresponding to different types of haptic feedback. For example, different threshold values correspond to haptic feedback applied to different portions of a user's body. Additionally, the amplitude estimation module 320 may maintain different threshold values associated with different users; hence, the amplitude estimation module 320 identifies a user of the VR system environment 100, retrieves one or more threshold values associated with the identified user, and compares the amplitude of haptic feedback corresponding to the haptic data to a retrieved threshold value. In some embodiments, the amplitude estimation module 320 compares the amplitude of haptic feedback to threshold values identifying different ranges of haptic feedback to determine whether the user perceives haptic feedback having an amplitude within the range, as described above in conjunction with FIG. 2B. If an amplitude of haptic feedback corresponding to haptic data at a particular time is less than a threshold value, the amplitude estimation module 320 communicates the haptic data to the VR input interface 140, or to another component of the VR system environment 100, to provide the haptic feedback.

In some embodiments, threshold values stored in the amplitude estimation module 320 are determined for a user through a calibration process. During the calibration process, haptic feedback with different amplitudes is applied to the user via the VR input interface 140. The user provides input to the amplitude estimation module 320 after application of haptic feedback with a particular amplitude indicating whether the user perceived the haptic feedback. After receiving input from the user, the amplitude estimation module 320 provides haptic data to the VR input interface 140 that applies haptic feedback with a lower amplitude than the particular amplitude to the user, who indicates to the amplitude estimation module 320 if the user perceived the lower amplitude haptic feedback. If the user does not perceive the lower amplitude haptic feedback applied after the haptic feedback with the particular amplitude, the amplitude estimation module 320 stores data indicating the particular amplitude of haptic feedback causes a refractory period for the user.

However, if the amplitude of haptic feedback corresponding to haptic data at a particular time equals or exceeds the threshold value, the feedback analysis module 330 identifies a refractory period occurring after application of the haptic feedback to the user. As described above in conjunction with FIG. 1, the refractory period is a time interval after application of haptic feedback greater than the threshold value during which a user has decreased sensitivity to application of lower intensity haptic feedback. A duration of the refractory period depends on characteristics of the user as well as characteristics of the haptic feedback having the amplitude equaling or exceeding the threshold value. For example, the duration of the refractory period depends on an age and a gender of the user, a portion of the user's body to which haptic feedback is applied, a type of haptic feedback applied to the user, an amplitude of the haptic feedback applied to the user, a frequency of the haptic feedback applied to the user, a time duration of the haptic feedback applied to the user, or other suitable information. In various embodiments, the feedback analysis module 330 maintains information describing different durations of a refractory period that are associated with different characteristics of a user and of haptic feedback. When the amplitude of haptic feedback corresponding to haptic data at a particular time equals or exceeds the threshold value, the feedback analysis module 330 retrieves a duration of a refractory period based on characteristics of the user and characteristics of the haptic feedback corresponding to the haptic data. In some embodiments, durations of one or more refractory periods stored by the feedback analysis module 330 are determined based on durations of refractory periods for various users. For example, a duration of a refractory period maintained by the feedback analysis module 330 is a mean, median, or mode of durations of the refractory period for various users (e.g., all users of the VR system environment 100, users of the VR system environment 100 having at least a threshold number of characteristics matching characteristics of a user to whom haptic feedback is to be applied) for a type of haptic feedback matching the haptic feedback to be provided to the user, or is determined from durations of refractory periods for various users through statistical analysis, machine learning, data mining, or any other method. In some embodiments, the refractory period may be determined during a calibration process where haptic feedback is applied to the user at a starting time and additional haptic feedback is applied to the user until a time when the user indicates the user perceives the additional haptic feedback. The duration of the refractory period is a length of time from the starting time until the time when the user indicates perception of the additional feedback, which is stored in association with the user and with a type of the haptic feedback.

The filter module 340 removes haptic data associated with times within the refractory period, preventing application of haptic feedback to the user during the refractory period. In various embodiments, the filter module 340 uses any suitable filter to remove haptic data associated with times after a time associated with a refractory period identified by the feedback analysis module 330 and within a duration of the refractory period. The filter module 340 may filter haptic data associated with haptic feedback having certain characteristics (e.g., having frequencies less than a threshold frequency, having frequencies greater than a threshold frequency, having frequencies within a specified range, having amplitudes greater than a threshold value, having amplitudes less than a threshold value, having amplitudes within a specified range, etc.).

Figure 4:
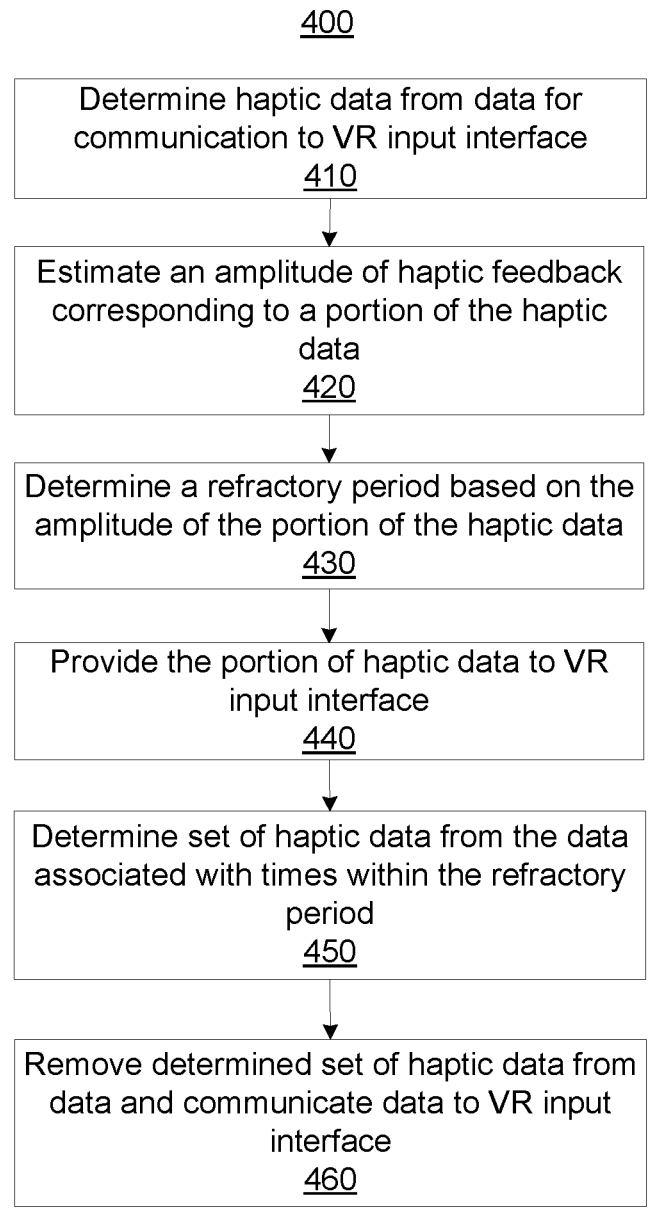
FIG. 4 is a flowchart of a process for controlling haptic feedback in a virtual reality system, in accordance with an embodiment.

FIG. 4 is a flowchart of one embodiment of a process 400 for controlling haptic feedback in a virtual reality system. The process 400 may be performed by the haptic control module 160 in some embodiments. Alternatively, other components may perform some or all of the steps of the process 400. Additionally, the process 400 may include different or additional steps than those described in conjunction with FIG. 4 in some embodiments or perform steps in different orders than the order described in conjunction with FIG. 4.

The haptic control module 160 receives data from the VR engine 155 for communication to the VR input interface 140 or to the VR headset 105 and determines 410 haptic data from the received data, as further described above in conjunction with FIG. 3. The haptic control module 160 determines 420 an estimated amplitude of haptic feedback corresponding to a portion of the haptic data and compares the estimated amplitude to a threshold value, also as further described above in conjunction with FIG. 3. For example, the haptic control module 160 identifies a user and a type of haptic feedback corresponding to the portion of the haptic data and retrieves a threshold value corresponding to the user and the type of haptic feedback. In the preceding example, the haptic control module 160 compares an estimated amplitude of haptic feedback corresponding to the portion of the haptic data to the threshold value. Based on the comparison, the haptic control module 160 determines 430 whether a refractory period occurs after the portion of the haptic data. If the estimated amplitude exceeds the threshold value, the haptic control module 160 determines 430 a refractory period occurs after the portion of the haptic data and determines a duration of the refractory period. As described above in conjunction with FIG. 3, the haptic control module 160 may maintain durations associated with various refractory periods and identify a duration for the refractory period based on characteristics of the user, characteristics of the haptic feedback corresponding to the portion of the haptic data, the estimated amplitude of haptic feedback corresponding to the portion of the haptic, or any other suitable information.

After determining 430 the refractory period occurs after the portion of the haptic data, the haptic control module 160 provides 440 the portion of the haptic data to the VR input interface 140, which provides the user with haptic feedback based on the haptic data. The haptic control module 160 also determines a set of the haptic data associated with times within the determined refractory period and removes 460 the determined set from the haptic data. Haptic data other than the determined set is communicated to the VR input interface 140 or another component of the VR system environment 100 to provide haptic feedback to the user. In some embodiments, the haptic control module 160 compares haptic feedback associated with times within the refractory period to training data associated with the user and removes certain haptic data form the set based on the comparison, as further described above in conjunction with FIG. 2B. Removing the determined set of haptic data associated with times within the determined refractory period prevents application of haptic feedback to the user during the refractory period, when the user is less likely to perceive haptic feedback.

In some embodiments, the haptic control module 160 adjusts the haptic data so that characteristics of the adjusted haptic data to not cause a refractory period. For example, if the haptic control module 160 determines 430 an amplitude of haptic feedback corresponding to the portion of the haptic data causes a refractory period, the haptic control module 160 attenuates the amplitude of the haptic feedback corresponding to the haptic data so the amplitude is less than a threshold value causing the refractory period. The haptic control module sends 160 the adjusted haptic data to the VR input interface 140 or to the VR headset 105.

In some embodiments, the haptic control module 160 analyzes haptic data as described above in real-time or in near-real times in response to one or more conditions being satisfied. For example, when a user performs a certain action to the VR input interface 140 (e.g., provides an input to touch an object presented by the VR system environment 100) or when certain actions are performed by the VR engine 155, the haptic control module 160 determines whether generated haptic feedback causes a refractory period for the user. Alternatively, the haptic control module 160 analyzes haptic data corresponding to haptic data included in one or more applications executed by the VR engine 155 prior to criteria for providing the haptic data to the VR input interface 140 or to another component of the VR system environment are satisfied. For example, the haptic control module 140 identifies haptic data included in an application when the application is started or installed in the VR system environment 100 and analyzes the haptic data as described above in conjunction with FIG. 4 and stores the modified haptic data for subsequent communication to the VR input interface 140 when criteria for providing haptic feedback to a user by the application are satisfied.

Additionally, the haptic control module 160 may analyze audio data to be provided to a user via the VR system environment 100 as described above. For example, after a user hears audio data having at least a threshold amplitude or having at least a threshold frequency, a refractory period occurs where the user is unable to hear at least a set of audio data played during the refractory period. Accordingly, the haptic control module 160 determines whether an amplitude or a frequency of audio data to be provided to a user exceeds a threshold value and determines a refractory period for a duration after the audio data is provided to the user if the amplitude or the frequency of the audio data equals or exceeds the threshold value. As described above, the haptic control module 160 removes a set of audio data associated with times within the refractory period, preventing presentation of audio data to the user during the refractory period. In some embodiments, the haptic control module 160 modifies the audio data if an amplitude or a frequency of the audio data equals or exceeds the threshold value to attenuate the audio data to prevent causing a refractory period for the user.

Additional Configuration Information

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A system comprising:
   an input interface configured to provide haptic feedback to a user in accordance with haptic data; and
   a console configured to:
      identify haptic data for communication to the input interface that causes the input interface to provide haptic feedback to the user,
      determine an estimated amplitude of haptic feedback corresponding to a portion of the haptic data,
      responsive to the estimated amplitude of the haptic feedback exceeding a threshold value, determine that a refractory period can occur after haptic feedback corresponding to the portion of the haptic data is applied to the user,
      provide the portion of the haptic data to the input interface,
      compare haptic feedback associated with times within a duration of the refractory period to user training data,
      responsive to the comparison indicating that characteristics of a set of haptic data associated with the times within the duration of the refractory period are within ranges of characteristics that are not perceived by the user in the user training data, remove the set of haptic data associated with the times within the duration of the refractory period from the identified haptic data to form an adjusted haptic data set, and
      provide to the input interface the adjusted haptic data set, wherein the input interface provides haptic feedback to the user in accordance with the adjusted haptic data set.

2. The system of claim 1, wherein the haptic data comprises audio data.

3. The system of claim 1, wherein determining the refractory period is based in part on a plurality of factors, the factors selected from a group consisting of: prior responses of the user to haptic feedback, characteristics of the user, a type of haptic feedback applied to the user, a portion of the user's body to which the haptic feedback is applied, a time duration of the haptic feedback applied to the user, and characteristics of haptic feedback applied to the user.

4. The system of claim 1, wherein the console is further configured to:
   determine characteristics of haptic feedback corresponding to the portion of the haptic data, wherein the characteristics are selected from a group consisting of: a plurality of amplitudes of the haptic feedback, a plurality of frequencies of the haptic feedback, and a plurality of phases of the haptic feedback;

compare the characteristics of haptic feedback corresponding to the portion of the haptic data to training data associated with the user, wherein the training data includes ranges of characteristics that are not perceived by the user; and responsive to the comparing indicating the characteristics of the set of haptic data are within the ranges of characteristics, remove the set of haptic data.

5. The system of claim 4, wherein the training data further comprises a pattern corresponding to frequency ranges and amplitude ranges of haptic feedback that are perceived by the user, and a pattern corresponding to frequency ranges and amplitude ranges of haptic feedback that are not perceived by the user.

6. The system of claim 1, wherein the console is further configured to:

adjust the haptic data not to cause a refractory period.

7. The system of claim 6, wherein adjusting the haptic data not to cause the refractory period comprises:

attenuating the amplitude of the haptic feedback corresponding to the haptic data such that the attenuated amplitude is less than a threshold value causing the refractory period.

8. A computer-implemented method comprising:

identifying haptic data for communication to an input interface that causes the input interface to provide haptic feedback to a user;

determining an estimated amplitude of haptic feedback corresponding to a portion of the haptic data;

responsive to the estimated amplitude of the haptic feedback exceeding a threshold value, determining that a refractory period can occur after haptic feedback corresponding to the portion of the haptic data is applied to the user;

providing the portion of the haptic data to the input interface;

comparing haptic feedback associated with times within a duration of the refractory period to user training data;

responsive to the comparison indicating that characteristics of a set of haptic data associated with the times within the duration of the refractory period are within ranges of characteristics that are not perceived by the user in the user training data, removing the set of haptic data associated with the times within the duration of the refractory period from the identified haptic data to form an adjusted haptic data;

providing to the input interface the adjusted haptic data set; and providing haptic feedback to the user in accordance with the adjusted haptic data set.

9. The method of claim 8, wherein the haptic data comprises audio data.

10. The method of claim 8, wherein determining the refractory period is based in part on a plurality of factors, the factors selected from a group consisting of: prior responses of the user to haptic feedback, characteristics of the user, a type of haptic feedback applied to the user, a portion of the user's body to which the haptic feedback is applied, a time duration of the haptic feedback applied to the user, and characteristics of haptic feedback applied to the user.

11. The method of claim 8, further comprising:

determining characteristics of haptic feedback corresponding to the portion of the haptic data, wherein the characteristics are selected from a group consisting of: a plurality of amplitudes of the haptic feedback, a plurality of frequencies of the haptic feedback, and a plurality of phases of the haptic feedback;

comparing the characteristics of haptic feedback corresponding to the portion of the haptic data to training data associated with the user, wherein the training data includes ranges of characteristics that are not perceived by the user; and responsive to the comparing indicating the characteristics of the set of haptic data are within the ranges of characteristics, removing the set of haptic data.

12. The method of claim 11, wherein the training data further comprises a pattern corresponding to frequency ranges and amplitude ranges of haptic feedback that are perceived by the user, and a pattern corresponding to frequency ranges and amplitude ranges of haptic feedback that are not perceived by the user.

13. The method of claim 8, further comprising:

adjusting the haptic data not to cause a refractory period.

14. The method of claim 13, wherein adjusting the haptic data not to cause the refractory period comprises:

attenuating the amplitude of the haptic feedback corresponding to the haptic data such that the attenuated amplitude is less than a threshold value causing the refractory period.

15. A non-transitory computer-readable medium comprising computer program instructions, the computer program instructions when executed by a computer processor causes the processor to perform steps including:

identifying haptic data for communication to an input interface that causes the input interface to provide haptic feedback to a user;

determining an estimated amplitude of haptic feedback corresponding to a portion of the haptic data;

responsive to the estimated amplitude of the haptic feedback exceeding a threshold value, determining that a refractory period can occur after haptic feedback corresponding to the portion of the haptic data is applied to the user;

providing the portion of the haptic data to the input interface;

comparing haptic feedback associated with times within a duration of the refractory period to user training data;

responsive to the comparison indicating that characteristics of a set of haptic data associated with the times within the duration of the refractory period are within ranges of characteristics that are not perceived by the user in the user training data, removing the set of haptic data associated with the times within the duration of the refractory period from the identified haptic data to form an adjusted haptic data;

providing to the input interface the adjusted haptic data set; and providing haptic feedback to the user in accordance with the adjusted haptic data set.

16. The non-transitory computer-readable storage medium of claim 15, wherein the haptic data comprises audio data.

17. The non-transitory computer-readable storage medium of claim 16, wherein determining the refractory period is based in part on a plurality of factors, the factors selected from a group consisting of: prior responses of the user to haptic feedback, characteristics of the user, a type of haptic feedback applied to the user, a portion of the user's body to which the haptic feedback is applied, a time duration of the haptic feedback applied to the user, and characteristics of haptic feedback applied to the user.

18. The non-transitory computer-readable storage medium of claim 16, further comprising:

determining characteristics of haptic feedback corresponding to the portion of the haptic data, wherein the characteristics comprising a plurality of amplitudes of the haptic feedback, a plurality of frequencies of the haptic feedback, a plurality of phases of the haptic feedback, or some combination thereof;

comparing the characteristics of haptic feedback corresponding to the portion of the haptic data to training data associated with the user, wherein the training data comprising characteristics ranges that are not perceived by the user; and removing a set of haptic data in response to the comparing that indicates the characteristics of the set of haptic data are within the characteristics ranges that are not perceived by the user in the training data.

* * * * *